US012639007B2

(12) United States Patent
Nijssen et al.

(10) Patent No.: US 12,639,007 B2
(45) Date of Patent: May 26, 2026

(54) FPGA MEMORY WITH AUTO ADDRESS MODE

(71) Applicant: Achronix Semiconductor Corporation, Santa Clara, CA (US)

(72) Inventors: Raymond Nijssen, San Jose, CA (US); Daniel Pugh, Los Gatos, CA (US); Naveen Bharathwaj Akesh, Los Gatos, CA (US); Christopher C. LaFrieda, Ridgefield, NJ (US); Sriram Radhakrishnan, Santa Clara, CA (US); Ronak Mehta, Santa Clara, CA (US); Virantha Namal Ekanayake, Baltimore, MD (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 165 days.

(21) Appl. No.: 18/581,131

(22) Filed: Feb. 19, 2024

(65) Prior Publication Data

US 2025/0265015 A1      Aug. 21, 2025

(51) Int. Cl.
*G11C 11/00* (2006.01)
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
CPC ...... G06F 3/0659; G06F 3/0604; G06F 3/064; G06F 3/0679
See application file for complete search history.

(56) References Cited

U.S. PATENT DOCUMENTS

| | | | | |
|---|---|---|---|---|
| 5,761,706 | A * | 6/1998 | Kessler | G06F 12/0862 711/E12.057 |
| 2006/0087342 | A1 | 4/2006 | Ayodhyawasi et al. | |
| 2006/0236072 | A1 * | 10/2006 | Lyon | G06F 12/0607 711/E12.079 |
| 2014/0281351 | A1 | 9/2014 | Topp et al. | |
| 2021/0373895 | A1 * | 12/2021 | Shahim | G06F 3/067 |
| 2021/0374055 | A1 | 12/2021 | Aga et al. | |

OTHER PUBLICATIONS

"International Application Serial No. PCT US2025 015081, International Search Report mailed Apr. 22, 2025", 2 pgs.
"International Application Serial No. PCT US2025 015081, Written Opinion mailed Apr. 22, 2025", 5 pgs.

* cited by examiner

*Primary Examiner* — Pho M Luu
(74) *Attorney, Agent, or Firm* — Schwegman Lundberg & Woessner, P.A.

(57) ABSTRACT

Memory blocks often consume many switch box resources. An 8-bit memory using 8-bit addressing uses at least eight address lines, eight data lines, a write-enable line, and a read-enable line. Using an auto address mode, the address and data are multiplexed on the same lines. The initial address and a stride are provided before the writing process begins. Between writes, the address is incremented by the stride. Thus, the memory block is able to determine the address for the next write based on the starting address and the stride, and does not need to receive the new address on the address lines. The auto address mode may be implemented by including a logic block within the memory block. The logic block may be programmed for purposes other than an auto address mode.

20 Claims, 7 Drawing Sheets

100

120A          130A          120B          130B

140B 140A  150A  150B  160

600

RECEIVE, BY A MEMORY BLOCK COMPRISING A LOGIC BLOCK AND A MEMORY, AN ADDRESS AND A STRIDE    ~ 610

ACCESS, BY THE LOGIC BLOCK, THE MEMORY USING THE ADDRESS    ~ 620

IN RESPONSE TO AN INCREMENT COMMAND, INCREMENTING, BY THE LOGIC BLOCK, THE ADDRESS BY THE STRIDE    ~ 630

ACCESS, BY THE LOGIC BLOCK, THE MEMORY USING THE INCREMENTED ADDRESS    ~ 640

FPGA MEMORY WITH AUTO ADDRESS MODE

TECHNICAL FIELD

The subject matter disclosed herein generally relates to methods, systems, and machine-readable storage media for providing memory with auto address modes inside a Field Programmable Gate Array (FPGA).

BACKGROUND

FPGAs comprise logic blocks and memory blocks coupled by switch boxes. Memory blocks often use many wires from switch boxes for address lines, data lines, and control lines. This limits the number of switch box wires that are available for other purposes.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
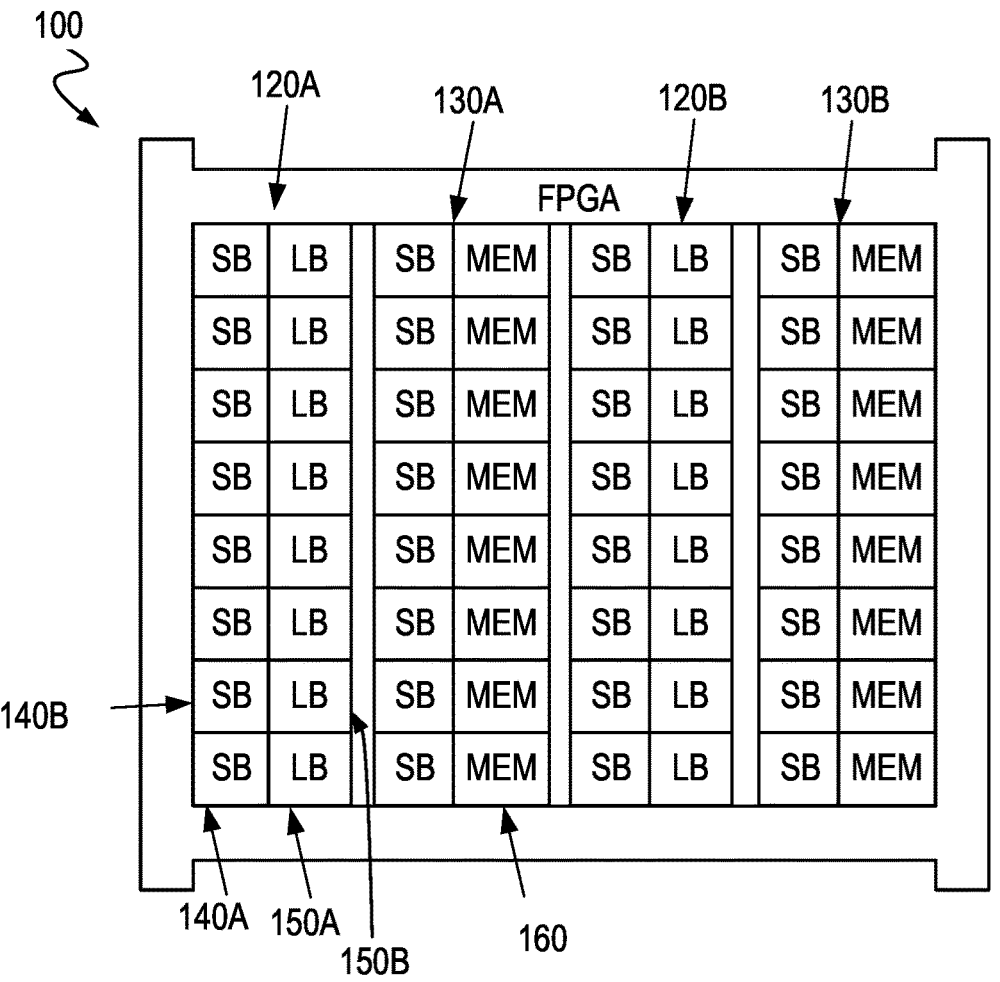
FIG. 1 illustrates the architecture of an FPGA with switch boxes, logic blocks, and memory blocks, according to some example embodiments.

Example methods, systems, and computer programs are directed to memory blocks in FPGAs that include logic to support auto addressing modes. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An FPGA (or other programmable integrated circuit) may include a number of columns. Each column is an array of elements including a switch box and a tile. A column comprising logic block tiles may be referred to as a logic column. A column comprising memory block tiles may be referred to as a memory column.

The routing of the switch boxes is determined when the FPGA is programmed. After programming, the switch boxes statically connect wires to neighboring switch boxes or the tile. By connecting to other switch boxes, signals can be routed to other tiles or columns. The tile may be a logic block, a memory block, or other specialized logic.

Memory columns often consume many switch box resources. For example, an 8-bit memory using 8-bit addressing uses at least eight address lines, eight data lines, a write-enable line, and a read-enable line. This leaves few switch box resources available for other uses, such as connecting to an adjacent column. As a result, longer routes may be used for connections, increasing the latency of the FPGA design.

Memory is accessed in response to access commands (e.g., reads and writes) that include an address. The addressed portion of memory is accessed. Write commands additionally include a data value to be written to the addressed memory. Write commands are responded to with an acknowledgement that the write was successful. Read commands are responded to with a data value read from the addressed memory. A common use of memory blocks is to perform sequential reads and writes. Sequential accesses are separated by a stride, which refers to the number of bytes it takes to step between accessed elements. For example, one hundred consecutive bytes may be written by performing one hundred consecutive writes in which the address for each write is one more than the previous write, using a stride of one.

Using an auto address mode, the address and data are multiplexed on the same lines. The initial address and a stride are provided before the writing process begins. Between writes, the address is incremented by the stride. Thus, the memory block is able to determine the address for the next write based on the starting address and the stride and does not need to receive the new address on the address lines. As a result, fewer lines are used from the switch box to the memory block, allowing more lines to be used for other purposes and, depending on the particular design, reducing overall latency.

The auto address mode may be implemented by including a logic block within the memory block. The logic block may be programmed for purposes other than an auto address mode. For example, a design that does not make use of all memory blocks may use the logic block within the unused memory blocks to implement additional application logic. This increases the overall logic density of the FPGA. Alternatively, the logic block may implement additional functionality related to the memory block. For example, the logic block may remap addresses dynamically in the event of faulty portions of the memory. As another example, the logic block can compare addresses on the read and write ports to implement a first-in, first-out (FIFO) queue with almost empty and almost full flags.

FIG. 1 illustrates the architecture of an FPGA 100 with switch boxes, logic blocks, and memory blocks, according to some example embodiments. The FPGA 100 includes logic columns 120A and 120B and memory columns 130A and 130B. The logic columns 120A-120B may be referred to collectively as logic columns 120 or generically as a logic column 120. The memory columns 130A-130B may be referred to collectively as memory columns 130 or generically as a memory column 130. The logic columns 120 comprise switch boxes and logic blocks. The memory columns 130 comprise switch boxes and memory blocks.

Switch boxes 140A and 140B, logic blocks 150A and 150B, and a memory block 160 will be referred to as examples of each type of component.

Each switch box comprises multiple horizontal and vertical channels. The switch box is configured to connect or disconnect the channels where they cross. Thus, the switch box 140A can be configured to connect wires from the west side of the FPGA 100 to the logic block 150A (using a convention that the top of FIG. 1 is the north direction). Alternatively, the switch box 140A can be configured to connect one or more wires from the west side of the FPGA 100 to vertical wires connecting the switch box 140A with the switch box 140B. The switch box 140B can be configured to connect those vertical wires to the logic block 150B or to allow the signals on those wires to continue propagating north. Thus, the column of switch boxes in the logic column 120A allows for the interconnection of any incoming wire from the west of the FPGA 100 to any logic block in the logic column 120A.

Similarly, the column of switch boxes in the memory column 130A allows the data signals from the logic blocks of the logic column 120A to be routed to any of the memory blocks of the memory column 130A, such as the memory block 160. The inputs to the memory blocks may include address lines, data lines, a data-ready signal, a write indicator, a read indicator, or any suitable combination thereof. In some example embodiments, channels skip some of the switch boxes. For example, a vertical channel may pass through every other switch box in a column. As another example, a hex-based design may be used instead of a square-based design and the hexes may connect to every sixth switch box.

As discussed herein, the memory block 160 may include an integrated logic block that supports one or more auto address modes. When using an auto address mode, the number of wires dedicated to the memory block 160 is reduced when compared to the normal address mode. In the normal address mode, an address is provided to the memory block 160 each time data is accessed. In the auto address mode, an address and a stride are loaded into the memory block 160, and further commands may use a 1-bit signal to indicate that the address should be increased by the stride for the command. Data lines can be used instead of address lines during loading of the address and stride. Accordingly, the routing resources of the switch boxes in the memory columns 130 are saved for other purposes.

Figure 2:
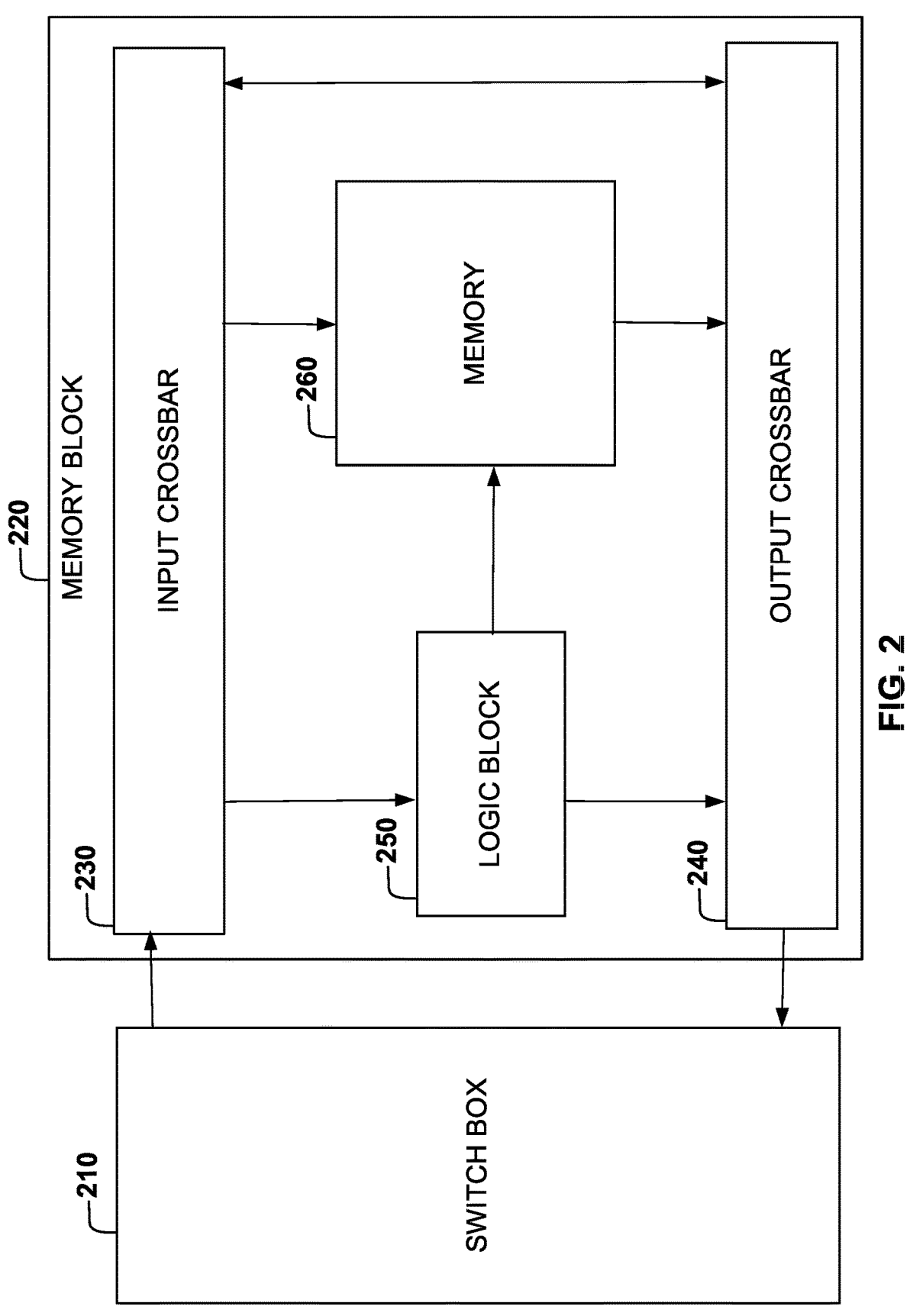
FIG. 2 illustrates a switch box connected to a memory block with auto address modes, according to some example embodiments.

FIG. 2 illustrates a switch box 210 connected to a memory block 220 with auto address modes, according to some example embodiments. The memory block 220 includes an input crossbar 230, an output crossbar 240, a logic block 250, and memory 260.

The switch box 210 provides input signals to the input crossbar 230 and receives output signals from the output crossbar 240. The input crossbar 230 is configured during the programming of an FPGA to connect specific wires from the switch box 210 to inputs for the logic block 250, the memory 260, or both. For example, in a configuration in which auto address mode is not used, the input crossbar 230 may be configured to route address, data, and command signals from the switch box 210 to the memory 260, bypassing the logic block 250 entirely. As another example, in a configuration in which the memory block 220 is used only to execute logic, the input crossbar 230 may be configured to route command and data signals to the logic block 250, ignoring the memory 260. The outputs of the logic block 250, the memory 260, or both, are provided to the output crossbar 240 and thereby routed back to the switch box 210.

In a configuration supporting an auto address mode, command and data signals may be routed to the logic block 250, and outputs from the logic block 250 may be routed to the address, data, and command inputs of the memory 260. The logic block 250 may be implemented using arithmetic logic units (ALUs), look-up tables (LUTs), registers, multiplexers, or any suitable combination thereof. Integration of the logic block 250 into the memory block 220 allows the switch box 210, the input crossbar 230, and the output crossbar 240 to be shared between the logic block 250 and the memory 260. Most of the area overhead of a logic block tile (e.g., the logic block 150A of FIG. 1) is in the routing. The memory tile already pays the area overhead for the switch box 210 and the crossbars 230-240. Accordingly, the additional area used by adding the logic block 250 to the memory block 220 is minimal.

The logic block 250 is designed to include enough resources to implement auto address logic and also has the flexibility to implement additional functionality. For example, the logic block 250 may be configured to remap addresses dynamically in the event of faulty address rows in the memory 260. As another example, the logic block 250 may implement address comparison functions on the read and write ports to implement a FIFO with almost empty/full flags.

The memory block 220 may be part of an FPGA and configured to operate in a first mode, a second mode, or a third mode. Configuration of the memory block 220 may occur at the time the FPGA is programmed. In the first mode, the memory block 220 operates normally, receiving an address for each memory access command. In the second mode, the memory block 220 uses the logic block 250 to generate addresses for read accesses. In the third mode, the memory block 220 uses the logic block 250 to generate addresses for write accesses.

Figure 3:
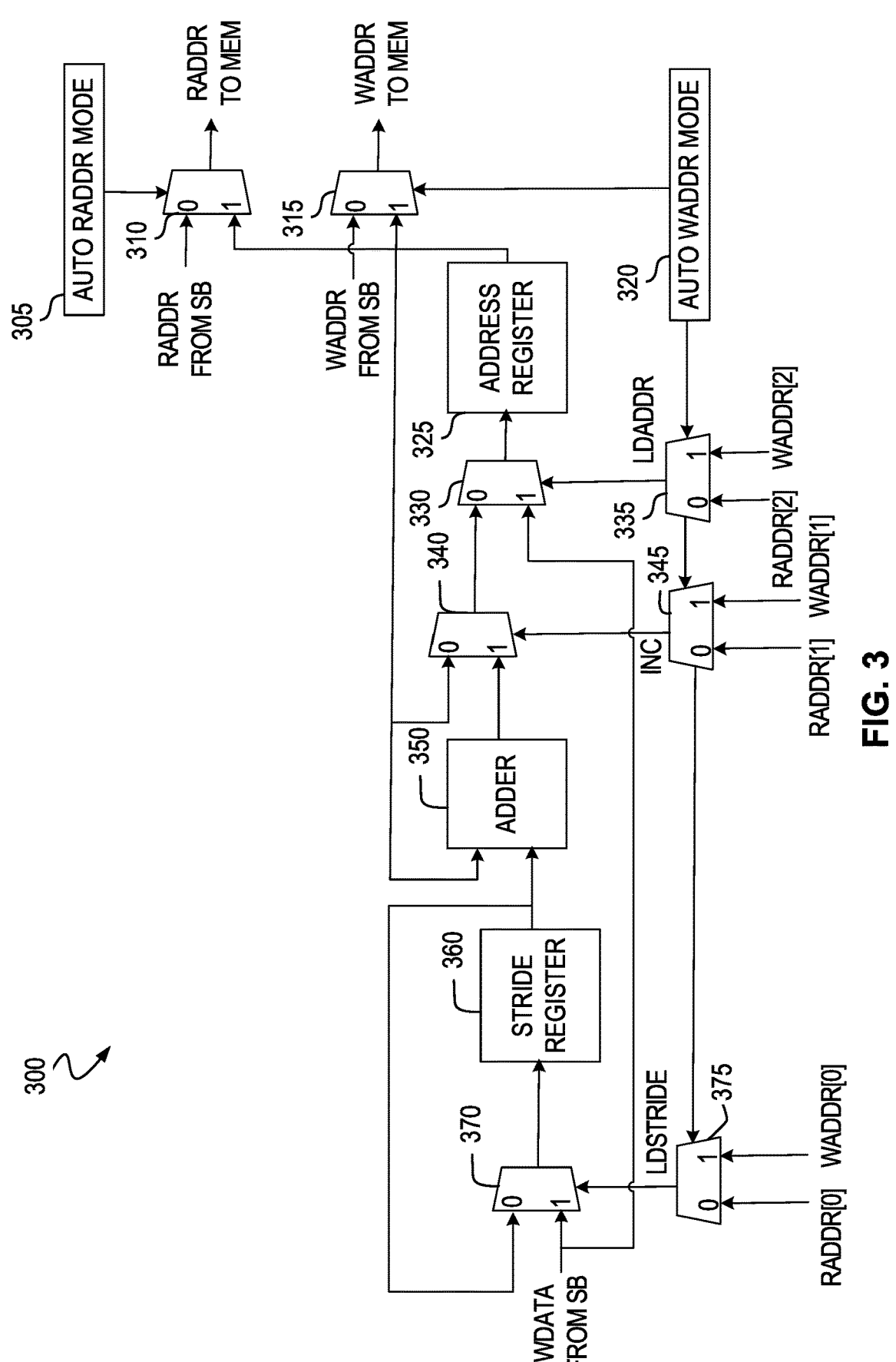
FIG. 3 illustrates logic to implement an auto address mode in a memory block, according to some example embodiments.

FIG. 3 illustrates logic 300 to implement an auto address mode in a memory block, according to some example embodiments. The logic 300 includes an auto read address mode signal 305; an auto write addressing mode signal 320; multiplexers 310, 315, 330, 335, 340, 345, 370, and 375; registers 325 and 360; and an adder 350. The logic block 250 of the memory block 220 of FIG. 2 may include the logic 300. To illustrate, reference will be made to the switch box 210 and the memory 260 of FIG. 2.

When the auto read address mode signal 305 is zero, the multiplexer 310 passes the read address received from a connected switch box to the memory 260. When the auto write addressing mode signal 320 is zero, the multiplexer 315 passes the write address received from a connected switch box to the memory 260. Thus, when neither auto address mode signal is asserted, the logic 300 does not affect the operation of the memory block 220.

To use the auto read addressing mode, the auto read address mode signal 305 is asserted and the auto write addressing mode signal 320 is not asserted. While the write addressing mode signal 320 is not asserted, the multiplexer 375 selects the 0-bit of the read address from the switch box 210 to use as the LDSTRIDE (load stride) signal. While the write addressing mode signal 320 is asserted, the multiplexer 375 selects the 0-bit of the write address from the switch box 210 to use as the LDSTRIDE signal.

When the LDSTRIDE signal is zero, the multiplexer 370 routes the output of the stride register 360 to the input of the stride register 360, thereby not affecting the value stored by the stride register 360. When the LDSTRIDE signal is one, the multiplexer 370 causes the write data received from the switch box 210 to be stored in the stride register 360. Thus, the 0-bit of the read or write address controls whether the write data from the switch box 210 is stored in the stride register 360.

While the write addressing mode signal 320 is not asserted, the multiplexer 345 selects the 1-bit of the read address from the switch box 210 to use as the INC (increment) signal. While the write addressing mode signal 320 is asserted, the multiplexer 345 selects the 1-bit of the write address from the switch box 210 to use as the INC signal.

When the INC signal is zero, the multiplexer 340 routes the output of the address register 325 toward the input of the address register 325. When the INC signal is one, the multiplexer 340 instead uses the output of the adder 350. The adder 350 generates the sum of the current address stored in the address register 325 with the stride stored in the stride register 360. Thus, the 1-bit of the read or write address controls whether the current address is incremented by the stride.

Based on the auto write addressing mode signal 320, the multiplexer 335 selects between the 2-bit of the read address from the switch box 210 and the 2-bit of the write address from the switch box 210. The selected bit is used as the LDADDR (load address) signal.

When the LDADDR signal is zero, the multiplexer 330 routes the output of the multiplexer 340 to the address register 325. Accordingly, when the address is not being loaded, the value stored in the address register 325 is either unchanged or is incremented by the stride, depending on the INC signal. When the LDADDR signal is one, the multiplexer 330 routes the write data from the switch box 210 to the address register 325. Thus, the 2-bit of the read or write address controls whether the write data from the switch box 210 is stored in the address register 325.

If the auto write addressing mode signal 320 is asserted, the multiplexer 315 causes the value stored in the address register 325 to be provided as the write address to the memory 260. If the auto read address mode signal 305 is asserted, the multiplexer 310 causes the value stored in the address register 325 to be provided as the read address to the memory 260. Thus, in the auto addressing mode, the full set of write data wires from the switch box 210 are used, but only three address wires are used (to control the LDSTRIDE, INC, and LDADDR signals). The auto write addressing mode signal 320 and the auto read address mode signal 305 may be constant values determined by the logic being implemented by a particular FPGA and thus connected to ground or the operating voltage without using wires of the switch box 210.

The WDATA signal from the switch box may be provided to the WDATA input of the memory 260, bypassing the logic 300. As a result, the logic 300 controls the address inputs to the memory 260 without affecting the data inputs. Alternatively, the WDATA signal received from the switch box may be routed to the WDATA input of the memory 260 by the logic 300, such that the data to be written is received using the same wires that receive the stride for the stride register 360 and the address for the address register 325.

Figure 4:
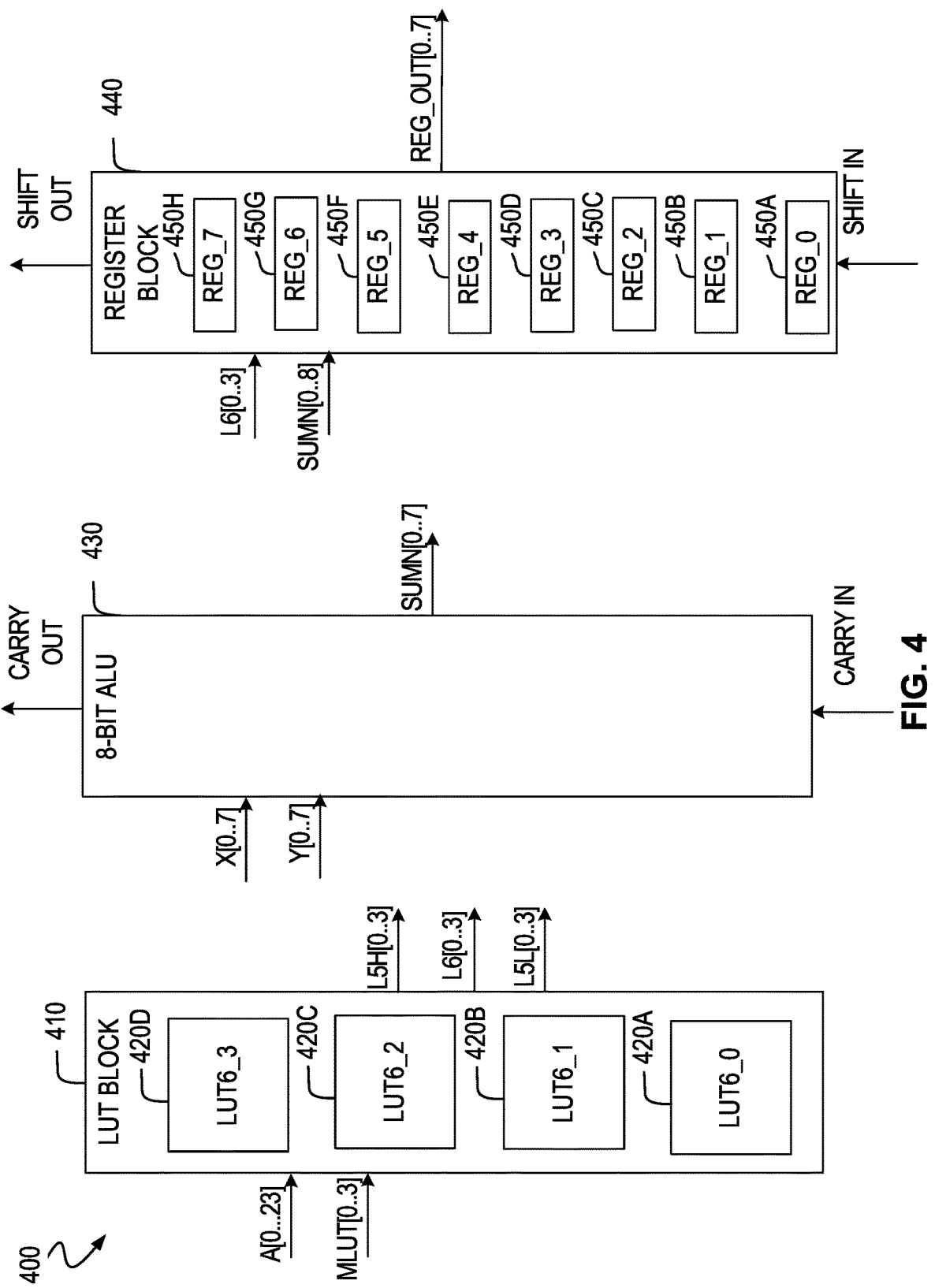
FIG. 4 illustrates an example logic group suitable for use in implementing the logic of FIG. 3, according to some example embodiments.

FIG. 4 illustrates an example logic group 400, suitable for use in implementing the logic 300 of FIG. 3, according to some example embodiments. The logic 300 of FIG. 3 could be implemented using the multiplexers and registers shown, but could also be implemented with a more versatile set of components. Using more versatile components enables the logic block 250 of FIG. 2 to be used to implement other functionality when the auto addressing mode is not being used.

The logic group 400 includes a LUT block 410, an ALU 430, and a register block 440. The LUT block 410 includes four 6-input LUTs 420A, 420B, 420C, and 420D. The LUT block 410 receives six inputs for each 6-input LUT, denoted as A[0 . . . 23]. Additionally, the LUT block 410 can be programmed to treat each 6-input LUT as two 5-input LUTs. A 6-input LUT is programmable to generate a 1-bit output for each different 6-bit input. A 5-input LUT is programmable to generate a 1-bit output for each different 5-bit input. The two 5-input LUTs for a 6-input LUT are referred to as the "low" and "high" 5-input LUTs.

In some example embodiments, the two 5-input LUTs are given the same inputs. In other example embodiments, a subset of the inputs are the same, and a subset of the inputs are different. To support this, additional input may be accepted by the LUT block 410. For example, the 6-input LUT 420A may receive inputs A[0 . . . 5] and MLUT[0]. When the 6-input LUT 420A is configured to operate as a 6-input LUT, inputs A[0 . . . 5] are used. When the 6-input LUT 420A is configured to operate as two 5-input LUTs, the low 5-input LUT may operate on A[0 . . . 4], and the high 5-input LUT may operate on A[0 . . . 2], MLUT[0], A[5]. Thus, three inputs to the two 5-input LUTs are the same and two can differ.

The output of the 6-input LUTs 420A-420D is shown as L6[0 . . . 3]. The outputs of the eight 5-input LUTs are shown as L5H[0 . . . 3] and L5L[0 . . . 3]. For each one of the 6-input LUTs 420A-420D, the single corresponding output in the L6[0 . . . 3] is used or the two corresponding outputs in the L5H[0 . . . 3] and L5L[0 . . . 3], depending on the programming of the LUT block 410.

The 8-bit ALU 430 receives two 8-bit inputs, shown as X[0 . . . 7] and Y[0 . . . 7], and a carry-in bit from another ALU. The sum of the 8-bit inputs (and carry in) is output as an 8-bit value, SUMN[0 . . . 7] and a carry-out bit. Using the carry-in and carry-out signals, multiple 8-bit ALUs can be connected together to create larger ALUs.

The register block 440 includes eight registers 450A, 450B, 450C, 450D, 450E, 450F, 450G, and 450H. Each of the registers 450A-450H may correspond to one bit of the output from the ALU 430, to one of the 6-input LUTs 420A-420D, to one of the 5-input component LUTs of one of the 6-input LUTs 420A-420D, or any suitable combination thereof. Logic for each of the registers 450A-450H may be configured to store a constant (e.g., 0 or 1), the output of the corresponding 6-input LUT, the output of the corresponding 5-input LUT, or the corresponding output from the ALU 430. The value of the eight registers 450A-450H (or a constant, LUT output, or ALU output) is provided as REG_OUT[0 . . . 7].

Figure 5:
FIG. 5 illustrates a logic block in a memory block, the logic block comprising six of the logic groups of FIG. 4, according to some example embodiments.
Figure 5:
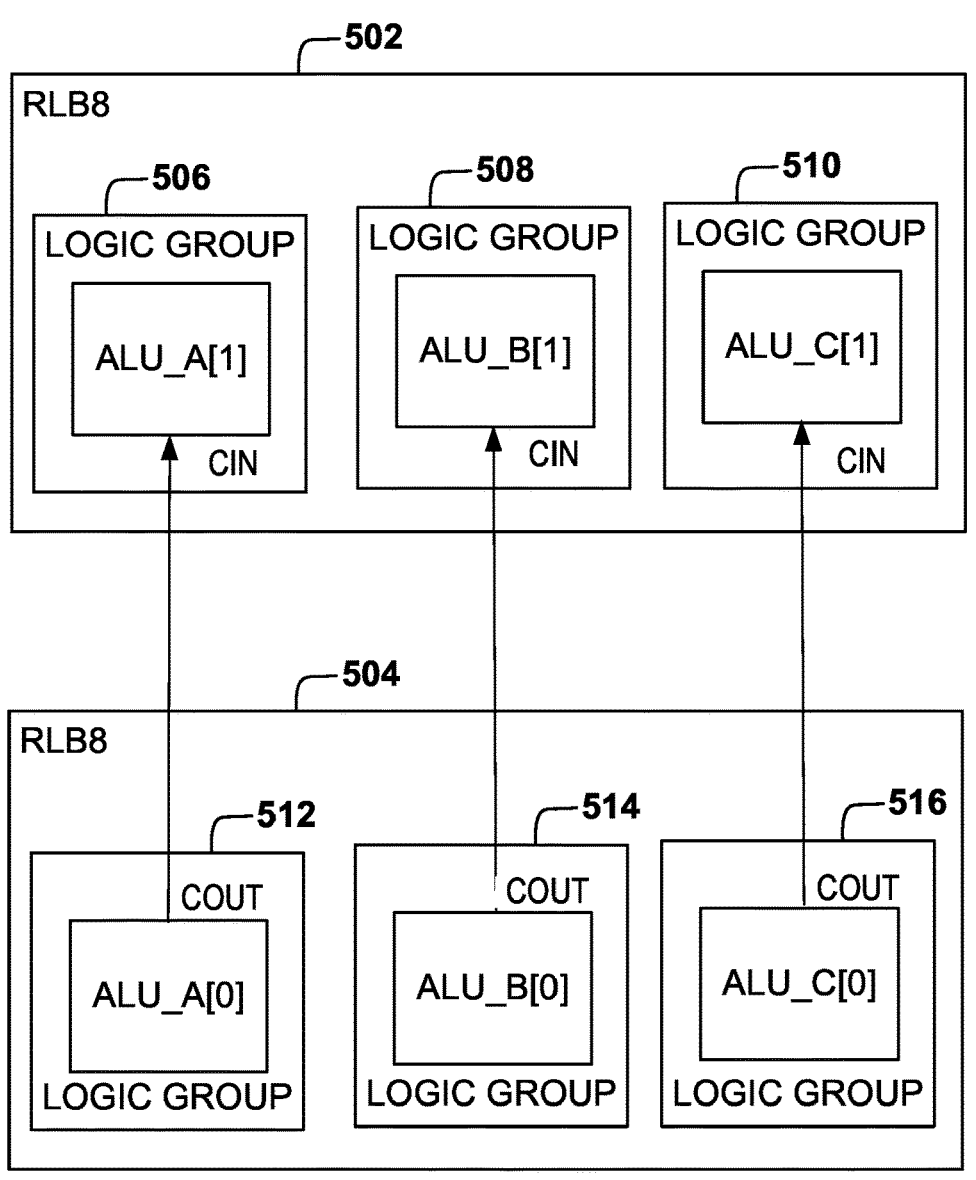

FIG. 5 illustrates a 16-bit reusable logic block (RLB16) 500 in a memory block, the RLB16 500 comprising six of the logic groups 400 of FIG. 4, according to some example embodiments. Using the RLB16 500 to form the logic block 250 of FIG. 2, 3 16-bit ALUs, 24 LUT6s, and 48 bits of register storage are available. The logic shown in FIG. 3 can be implemented using one 16-bit adder (to add the stride to the address), two 16-bit registers (to store the stride and the address), and three 8-bit 2:1 muxes (to handle control signals). Each 8-bit mux is implemented using 8 LUT6s. Accordingly, the logic block 250 also has two 16-bit ALUs and 16 bits of register storage available for other uses.

The RLB16 500 is composed of two 8-bit reusable logic blocks (RLB8), each of which includes three of the logic groups 400. The RLB8 502 includes logic groups 506, 508, and 510. The RLB8 504 includes logic groups 512, 514, and 516. The carry-in signals of the ALUs of the logic groups 512, 514, and 516 are connected to a constant zero signal. The carry-in signals of the ALUs of the logic groups 506, 508, and 510 are connected to the carry-out signals of the logic groups 512, 514, and 516, respectively. The carry-out signals of the ALUs of the logic groups 512, 514, and 516 are ignored or used as overflow signals.

The 8-bit outputs of the RLB8s 502 and 504 may be concatenated and treated as the 16-bit outputs of the RLB 16 500. Thus, the RLB16 500 may generate three 16-bit ALU results, three 16-bit register results, and three sets of eight LUT6 outputs. The RLB16 may also be configured to treat the LUT6s as pairs of LUT5s, thus producing three sets of sixteen LUT5 outputs.

As shown in FIG. 2, the logic block 250 (and thus the RLB16 500) may be coupled to the switch box 210 via the input crossbar 230. Thus, WDATA, WADDR, RADDR, and control signals may be received from the switch box 210 to control operation of the RLB16 500. When the memory 260 of FIG. 2 is not being used, or when the RLB16 500 is implementing functionality other than or in addition to an auto address mode, additional inputs to the RLB16 500 may be received from the switch box 210, such as ALU operands, LUT indices, register values, register access commands, or any suitable combination thereof. Outputs generated by the RLB16 500 may be provided to the output crossbar 240 of FIG. 2, for routing to the switch box 210 and, from there, to other tiles of the FPGA 100 of FIG. 1.

Figure 6:
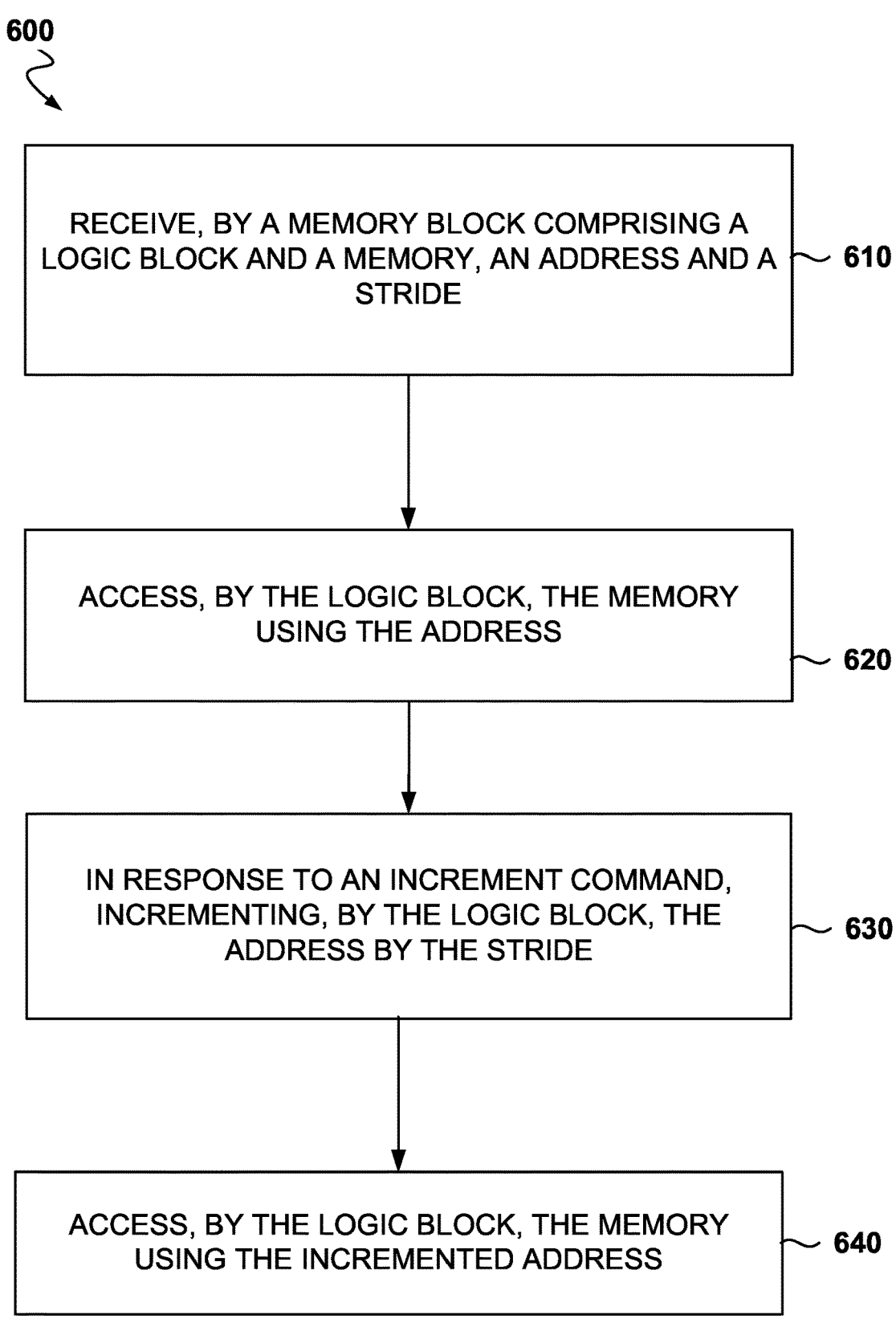
FIG. 6 is a flowchart of a method for implementing an auto address mode in a memory block, according to some example embodiments.

FIG. 6 is a flowchart of a method 600 for implementing an auto address mode in a memory block, according to some example embodiments. The method 600 includes operations 610, 620, 630, and 640. By way of example and not limitation, the method 600 is described as being performed by the logic block 250 of the memory block 220 of FIG. 2, implemented using the RLB16 500 of FIG. 5 composed of the logic groups 400 of FIG. 4. The RLB16 500 may implement the logic shown in FIG. 3.

In operation 610, the memory block 220, comprising the logic block 250 and the memory 260, receives an address and a stride. For example, one or more of the LUT6s 420A-420D may be used to implement the multiplexers 310, 315, 330, 335, 340, 345, 370, and 375 of FIG. 3. The address register 325 may be implemented using sixteen-bit storage provided by the logic groups 508 and 514. The stride register 360 may be implemented using sixteen-bit storage provided by the logic groups 506 and 512. The address and the stride may be received sequentially. For example, at a first time, the LDADDR signal of FIG. 3 may be asserted and an address received on the WDATA signal. In response, the address is stored in the address register 325. At a second time, the LDSTRIDE signal of FIG. 3 is asserted, and a stride is received on the WDATA signal. In response, the stride is stored in the stride register 360.

The logic block 250, in operation 620, accesses the memory 260 using the address. For example, after loading the address and the stride, a first memory access (e.g., a read or a write) is performed using the loaded address. With reference to FIG. 3, the loopback input to the address register 325 is just the output from the address register 325, unless the INC signal is asserted. Accordingly, if the INC signal is not asserted before a memory access is performed, and the logic block 250 is configured in AUTO WADDR MODE or AUTO RADDR MODE, the read and write addresses provided to the memory 260 are the address received in operation 610.

In response to an increment command, the logic block 250 increments, in operation 630, the address by the stride. Returning to FIG. 3, the adder 350 adds the stride stored in the stride register 360 to the current address stored in the address register 325. When an INC signal is received, the multiplexer 340 selects the output of the adder 350, which may be implemented using the ALUs of the logic groups 506 and 512 as the input to the address register 325. As a result, when the INC signal is received, the address stored in the address register 325 is incremented by the stride.

In operation 640, the logic block 250 accesses the memory 260 using the incremented address. As discussed above with respect to the operation 620, the value stored in the address register 325 is used as the read address and write address while the logic block 250 is configured in AUTO WADDR MODE or AUTO RADDR MODE. Thus, the incremented value of the address is used in the next memory access. Further memory accesses may be performed at addresses separated by the stride by continuing (or repeating) the assertion of INC and performing additional reads or writes.

Thus, by use of the method 600, the memory block 220 is enabled to access a sequence of addresses by loading an address and a stride once, then receiving a 1-bit INC signal. The address and the stride may be received using the same wires (e.g., the WDATA wires from the switch box, as shown in FIG. 3). Furthermore, when the memory access is a write, the data to be written may also be received using the same wires as the address and the stride. This reduces the use of interconnections over standard implementations that load the address for each memory access command.

Example 1 is a memory block comprising: a memory; and a logic block coupled to the memory and configured to perform operations comprising: sequentially receiving an address and a stride using the same wires; accessing the memory using the address; in response to an increment command, incrementing the address by the stride; and accessing the memory using the incremented address.

In Example 2, the subject matter of Example 1, wherein the accessing of the memory using the address comprises writing data to the address.

In Example 3, the subject matter of Example 2, wherein the operations further comprise: receiving the data using the same wires used to receive the address.

In Example 4, the subject matter of Examples 1-3, wherein the operations further comprise: receiving a second stride; in response to a second increment command, further incrementing the address by the second stride; and accessing the memory using the further incremented address.

In Example 5, the subject matter of Examples 1-4, wherein the receiving of the stride uses the same wires as the receiving of the address.

In Example 6, the subject matter of Examples 1-5, wherein the logic block is coupled to a switch box of a field programmable gate array (FPGA).

In Example 7, the subject matter of Examples 1-6, wherein the logic block comprises a plurality of look-up tables (LUTs) and an arithmetic logic unit (ALU).

Example 8 is a method comprising: receiving, by a memory block comprising a logic block and a memory, an address and a stride; accessing, by the logic block, the memory using the address; in response to an increment command, incrementing, by the logic block, the address by the stride; and accessing, by the logic block, the memory using the incremented address.

In Example 9, the subject matter of Example 8, wherein the accessing of the memory using the address comprises writing data to the address.

In Example 10, the subject matter of Example 9 includes receiving, by the logic block, the data using the same wires used to receive the address.

In Example 11, the subject matter of Examples 8-10 includes receiving, by the logic block, a second stride; in response to a second increment command, further incrementing the address by the second stride; and accessing, by the logic block, the memory using the further incremented address.

In Example 12, the subject matter of Examples 8-11, wherein the receiving of the stride uses the same wires as the receiving of the address.

In Example 13, the subject matter of Examples 8-12, wherein the logic block is coupled to a switch box of a field programmable gate array (FPGA).

In Example 14, the subject matter of Examples 8-13, wherein the logic block comprises a plurality of look-up tables (LUTs) and an arithmetic logic unit (ALU).

Example 15 is a non-transitory machine-readable medium that comprises instructions that, when executed by one or more processors, cause the one or more processors to configure a logic block of a memory block of a field programmable gate array (FPGA) to perform operations comprising: receiving an address and a stride; accessing a memory of the memory block using the address; in response to an increment command, incrementing the address by the stride; and accessing the memory using the incremented address.

In Example 16, the subject matter of Example 15, wherein the accessing of the memory using the address comprises writing data to the address.

In Example 17, the subject matter of Example 16, wherein the operations further comprise: receiving the data using the same wires used to receive the address.

In Example 18, the subject matter of Examples 15-17, wherein the operations further comprise: receiving a second stride; in response to a second increment command, further incrementing the address by the second stride; and accessing the memory using the further incremented address.

In Example 19, the subject matter of Examples 15-18, wherein the receiving of the stride uses the same wires as the receiving of the address.

In Example 20, the subject matter of Examples 15-19, wherein the logic block is coupled to a switch box of the FPGA.

Example 21 is an apparatus comprising means to implement any of Examples 1-20.

Figure 7:
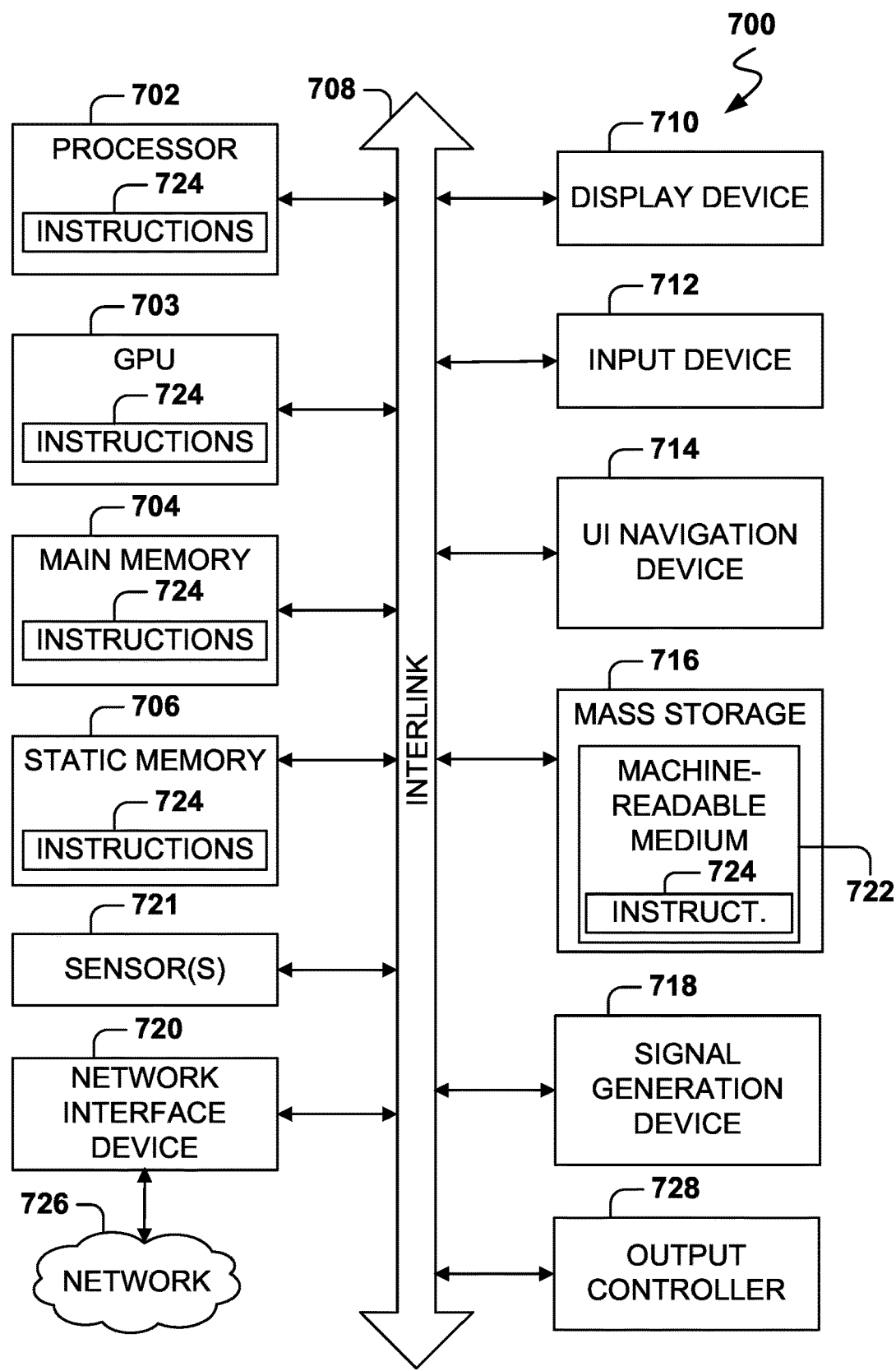
FIG. 7 is a block diagram illustrating an example of a machine upon or by which one or more example process embodiments described herein may be implemented or controlled.

FIG. 7 is a block diagram illustrating an example of a machine 700 upon or by which one or more example process embodiments described herein may be implemented or controlled. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 700 may include a hardware processor 702 (e.g., a central processing unit (CPU), a hardware processor core, or any combination thereof), a graphics processing unit (GPU) 703, a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device (e.g., drive unit) 716, a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, within the hardware processor 702, or within the GPU 703 during execution thereof by the machine 700. In an example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium, or multiple media, (e.g., a centralized or distributed database, and/or associated caches and servers) configured to store the one or more instructions 724.

The term "machine-readable medium" may include any medium that is capable of storing, encoding, or carrying instructions 724 for execution by the machine 700 and that cause the machine 700 to perform any one or more of the techniques of the present disclosure, or that is capable of storing, encoding, or carrying data structures used by or associated with such instructions 724. Non-limiting machine-readable medium examples may include solid-state memories, and optical and magnetic media. In an example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A memory block comprising:
a memory; and
a logic block coupled to the memory and configured to perform operations comprising:
sequentially receiving an address on a set of wires and a first stride using the set of wires;
accessing the memory using the address;
in response to a first increment command, incrementing the address by the first stride;
accessing the memory using the incremented address;
receiving a second stride;
in response to a second increment command, further incrementing the address by the second stride; and
accessing the memory using the further incremented address.

2. The memory block of claim 1, wherein the accessing of the memory using the address comprises writing data to the address.

3. The memory block of claim 2, wherein the operations further comprise:
receiving the data using the same wires used to receive the address.

4. The memory block of claim 1, wherein the receiving of the second stride uses the same wires as the receiving of the address.

5. The memory block of claim 1, wherein the logic block is coupled to a switch box of a field programmable gate array (FPGA).

6. The memory block of claim 1, wherein the logic block comprises a plurality of look-up tables (LUTs) and an arithmetic logic unit (ALU).

7. The memory block of claim 1, wherein the same wires comprise an input crossbar.

8. A method comprising:
receiving, by a memory block comprising a logic block and a memory, an address and a first stride;
accessing, by the logic block, the memory using the address;
in response to a first increment command, incrementing, by the logic block, the address by the first stride; and
accessing, by the logic block, the memory using the incremented address;
receiving, by the logic block, a second stride;
in response to a second increment command, further incrementing the address by the second stride; and
accessing, by the logic block, the memory using the further incremented address.

9. The method of claim 8, wherein the accessing of the memory using the address comprises writing data to the address.

10. The method of claim 9, further comprising:
receiving, by the logic block, the data using the same wires used to receive the address.

11. The method of claim 8, wherein the receiving of the first stride uses the same wires as the receiving of the address.

12. The method of claim 8, wherein the logic block is coupled to a switch box of a field programmable gate array (FPGA).

13. The method of claim 8, wherein the logic block comprises a plurality of look-up tables (LUTs) and an arithmetic logic unit (ALU).

14. The method of claim 8, wherein the receiving of the address and the first stride comprises receiving the address and the first stride via an input crossbar.

15. A non-transitory machine-readable medium that comprises instructions that, when executed by one or more processors, cause the one or more processors to configure a logic block of a memory block of a field programmable gate array (FPGA) to perform operations comprising:

receiving an address and a first stride;
  accessing a memory of the memory block using the
    address;
  in response to a first increment command, incrementing
    the address by the first stride;
  accessing the memory using the incremented address;
  receiving a second stride;
  in response to a second increment command, further
    incrementing the address by the second stride; and accessing the memory using the further incremented
    address.

16. The non-transitory machine-readable medium of claim 15, wherein the accessing of the memory using the address comprises writing data to the address.

17. The non-transitory machine-readable medium of claim 16, wherein the operations further comprise:

receiving the data using the same wires used to receive the
    address.

18. The non-transitory machine-readable medium of claim 15, wherein t receiving of the first stride uses the same wires as the receiving of the address.

19. The non-transitory machine-readable medium of claim 15, wherein the logic block is coupled to a switch box of the FPGA.

20. The non-transitory machine-readable medium of claim 15, wherein the logic block comprises a plurality of look-up tables (LUTs) and an arithmetic logic unit (ALU).

* * * * *